(12) United States Patent
Yoshimura

(10) Patent No.: US 11,212,489 B2
(45) Date of Patent: Dec. 28, 2021

(54) IMAGING DEVICE, IMAGING METHOD, ELECTRONIC APPARATUS, AND ONBOARD ELECTRONIC APPARATUS

(71) Applicant: Sony Corporation, Tokyo (JP)

(72) Inventor: Shin Yoshimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/563,709

(22) PCT Filed: Mar. 25, 2016

(86) PCT No.: PCT/JP2016/059550
§ 371 (c)(1),
(2) Date: Oct. 2, 2017

(87) PCT Pub. No.: WO2016/163248
PCT Pub. Date: Oct. 13, 2016

(65) Prior Publication Data
US 2018/0077388 A1    Mar. 15, 2018

(30) Foreign Application Priority Data
Apr. 9, 2015 (JP) .............................. JP2015-079679

(51) Int. Cl.
*H04N 5/91* (2006.01)
*H04N 5/225* (2006.01)
(Continued)

(52) U.S. Cl.
CPC ............ *H04N 7/18* (2013.01); *B60R 11/02* (2013.01); *G03B 7/093* (2013.01); *H04N 5/225* (2013.01);
(Continued)

(58) Field of Classification Search
None
See application file for complete search history.

(56) References Cited

U.S. PATENT DOCUMENTS 6,411,302 B1 * 6/2002 Chiraz ............... G06F 3/1431
345/531
7,043,019 B2 * 5/2006 Tehranchi ............ G06T 1/005
348/E9.027
(Continued)

FOREIGN PATENT DOCUMENTS

CN    101052101 A    10/2007
CN    102196184 A    9/2011
(Continued)

OTHER PUBLICATIONS

Machine level translation of Shinichi, JP 201123418 A.*
(Continued)

*Primary Examiner* — Mohammad J Rahman
(74) *Attorney, Agent, or Firm* — Wolf, Greenfield & Sacks, P.C.

(57) ABSTRACT

The present disclosure relates to an imaging device, an imaging method, an electronic apparatus, and an onboard electronic apparatus for suppressing the flicker caused by light sources over a wide range of frequencies.
With the present technology, multiple images are captured consecutively at uneven intervals in a single-frame period of a video before being blended. This removes the flicker efficiently. The uneven capture timing in the single-frame period is made the same for multiple frames. This makes it possible to prevent low-frequency flicker from getting higher in frequency. The present disclosure may be applied to onboard cameras, for example.

14 Claims, 15 Drawing Sheets

(51) Int. Cl.
    *H04N 5/335*      (2011.01)
    *H04N 7/18*      (2006.01)
    *G03B 7/093*      (2021.01)
    *H04N 5/232*      (2006.01)
    *B60R 11/02*      (2006.01)
    *H04N 5/235*      (2006.01)

(52) U.S. Cl.
    CPC ........... *H04N 5/232* (2013.01); *H04N 5/2357* (2013.01); *H04N 5/23277* (2013.01); *H04N 5/335* (2013.01); *H04N 5/91* (2013.01)

(56) References Cited

U.S. PATENT DOCUMENTS

| | | | | |
|---|---|---|---|---|
| 9,542,720 | B2* | 1/2017 | Shimomura | G06T 11/60 |
| 10,257,477 | B2* | 4/2019 | Richards | G09G 3/002 |
| 2002/0093468 | A1* | 7/2002 | Ouchi | G09G 3/3225 345/55 |
| 2002/0110274 | A1* | 8/2002 | Yamamoto | G06T 11/40 382/154 |
| 2002/0168069 | A1* | 11/2002 | Tehranchi | G06T 1/005 380/235 |
| 2005/0057473 | A1* | 3/2005 | Hsu | G09G 3/3611 345/89 |
| 2006/0152444 | A1* | 7/2006 | Park | G09G 3/2051 345/63 |
| 2006/0152598 | A1* | 7/2006 | Kawarada | H04N 5/23248 348/226.1 |
| 2006/0269155 | A1* | 11/2006 | Tener | G06T 3/4038 382/243 |
| 2007/0230932 | A1* | 10/2007 | Tanaka | G03B 7/00 396/55 |
| 2009/0231425 | A1* | 9/2009 | Zalewski | H04N 7/18 348/142 |
| 2010/0013953 | A1* | 1/2010 | Niikura | H04N 5/2353 348/226.1 |
| 2010/0020237 | A1* | 1/2010 | Miyasaka | H04N 21/431 348/563 |
| 2010/0060751 | A1* | 3/2010 | Pinto | H04N 5/235 348/226.1 |
| 2010/0295953 | A1* | 11/2010 | Torii | G06T 5/003 348/208.4 |
| 2011/0050969 | A1* | 3/2011 | Nishihara | G01J 1/44 348/296 |
| 2011/0063473 | A1* | 3/2011 | Tsunekawa | G06T 3/4015 348/222.1 |
| 2011/0221929 | A1 | 9/2011 | Miyahara et al. | |
| 2011/0242341 | A1* | 10/2011 | Agrawal | G06T 3/4007 348/218.1 |
| 2011/0255786 | A1* | 10/2011 | Hunter | H04N 5/21 382/190 |
| 2012/0044381 | A1* | 2/2012 | Jannard | H04N 5/2355 348/229.1 |
| 2012/0050074 | A1* | 3/2012 | Bechtel | B60R 1/04 340/988 |
| 2012/0105639 | A1* | 5/2012 | Stein | H04N 5/235 348/148 |
| 2012/0200736 | A1* | 8/2012 | Toyoda | H04N 5/2357 348/226.1 |
| 2013/0021487 | A1* | 1/2013 | Ishino | H04N 5/23222 348/220.1 |
| 2013/0063652 | A1* | 3/2013 | Komatsu | H04N 5/23229 348/362 |
| 2013/0113971 | A1* | 5/2013 | Okada | H04N 5/3742 348/308 |
| 2014/0139565 | A1* | 5/2014 | Choi | G09G 3/2018 345/691 |
| 2014/0333825 | A1* | 11/2014 | Nakagawara | H04N 5/2353 348/362 |
| 2015/0103107 | A1* | 4/2015 | Kobayashi | G09G 3/3426 345/691 |
| 2015/0195487 | A1* | 7/2015 | Liu | H04N 5/21 348/447 |
| 2015/0350544 | A1* | 12/2015 | Williams | H04N 5/23245 348/239 |
| 2016/0198133 | A1* | 7/2016 | Evans | H04N 9/3114 345/8 |
| 2016/0255264 | A1* | 9/2016 | Russell | G06F 3/147 348/226.1 |
| 2017/0201669 | A1* | 7/2017 | Rabyking | H04N 9/04 |

FOREIGN PATENT DOCUMENTS

| | | |
|---|---|---|
| JP | 2008-211442 A | 9/2008 |
| JP | 2009-017293 A | 1/2009 |
| JP | 2009-027666 A | 2/2009 |
| JP | 2009-278496 A | 11/2009 |
| JP | 2011-004188 A | 1/2011 |
| JP | 2011-234318 A | 11/2011 |

OTHER PUBLICATIONS

International Search Report and Written Opinion and English translation thereof dated Jun. 7, 2016 in connection with International Application No. PCT/JP2016/059550.

International Preliminary Report on Patentability and English translation thereof dated Oct. 19, 2017 in connection with International Application No. PCT/JP2016/059550.

Extended European Search Report dated Oct. 12, 2018 in connection with European Application No. 16776416.6.

Chinese Office Action dated Aug. 19, 2019 in connection with Chinese Application No. 201680019011.1 and English translation thereof.

Communication pursuant to Article 94(3) dated Sep. 9, 2019 in connection with European Application No. 16776416.6.

Japanese Office Action dated Oct. 8, 2019 in connection with Japanese Application No. 2017-511535 and English translation thereof.

Chinese Office Action dated May 15, 2020 in connection with Chinese Application No. 201680019011.1, and English translation thereof.

* cited by examiner

FIG.10

| | IMAGING TARGETS | LOCATIONS/CAR TYPES MEASURED | EMISSION FREQUENCIES (Hz) | EMISSION Duty RATIOS (%) |
|---|---|---|---|---|
| TRAFFIC SIGNALS | LED TRAFFIC SIGNALS | 7 LOCATIONS IN KANTO AREA | 100 | 70 |
| SIGNS | LED SPEED LIMIT SIGNS (DAY) | KYUSHU AREA | 120 | 80 |
| | | KYUSHU AREA | 240 | 60 |
| | | KANTO AREA | 250 | 50 |
| | LED SPEED LIMIT SIGNS (NIGHT) | KYUSHU AREA | 240 | 20 |
| | | KANTO AREA | 250 | 20 |
| | LED STOP SIGNS | KYUSHU AREA | 300 | 60 |
| VEHICLES | LED POSITIONING LIGHTS | JAPANESE CAR A | 200 | 20 |
| | | JAPANESE CAR B | 500 | 50 |
| | | JAPANESE CAR C | 125 | 20 |
| | LED BLINKERS | JAPANESE CAR C (FRONT) | 200 | 80 |
| | | JAPANESE CAR C (REAR) | 125 | 90 |
| | LED TAIL LAMPS | JAPANESE CAR C (REAR INSIDE) | 125 | 70 |
| | | JAPANESE CAR C (REAR OUTSIDE) | 125 | 50 |
| | LED HIGH-MOUNTED STOP LAMPS | JAPANESE CAR C | 125 | 90 |

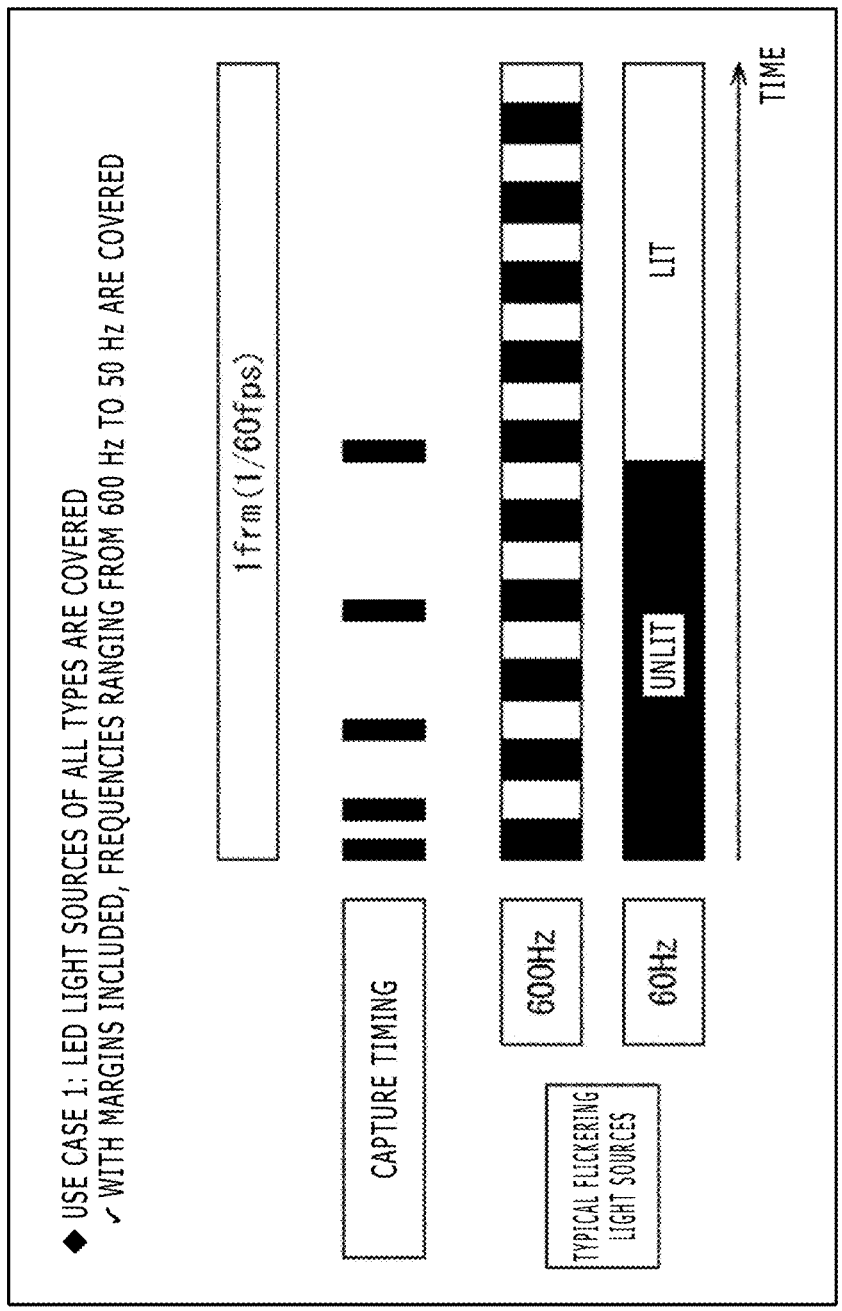

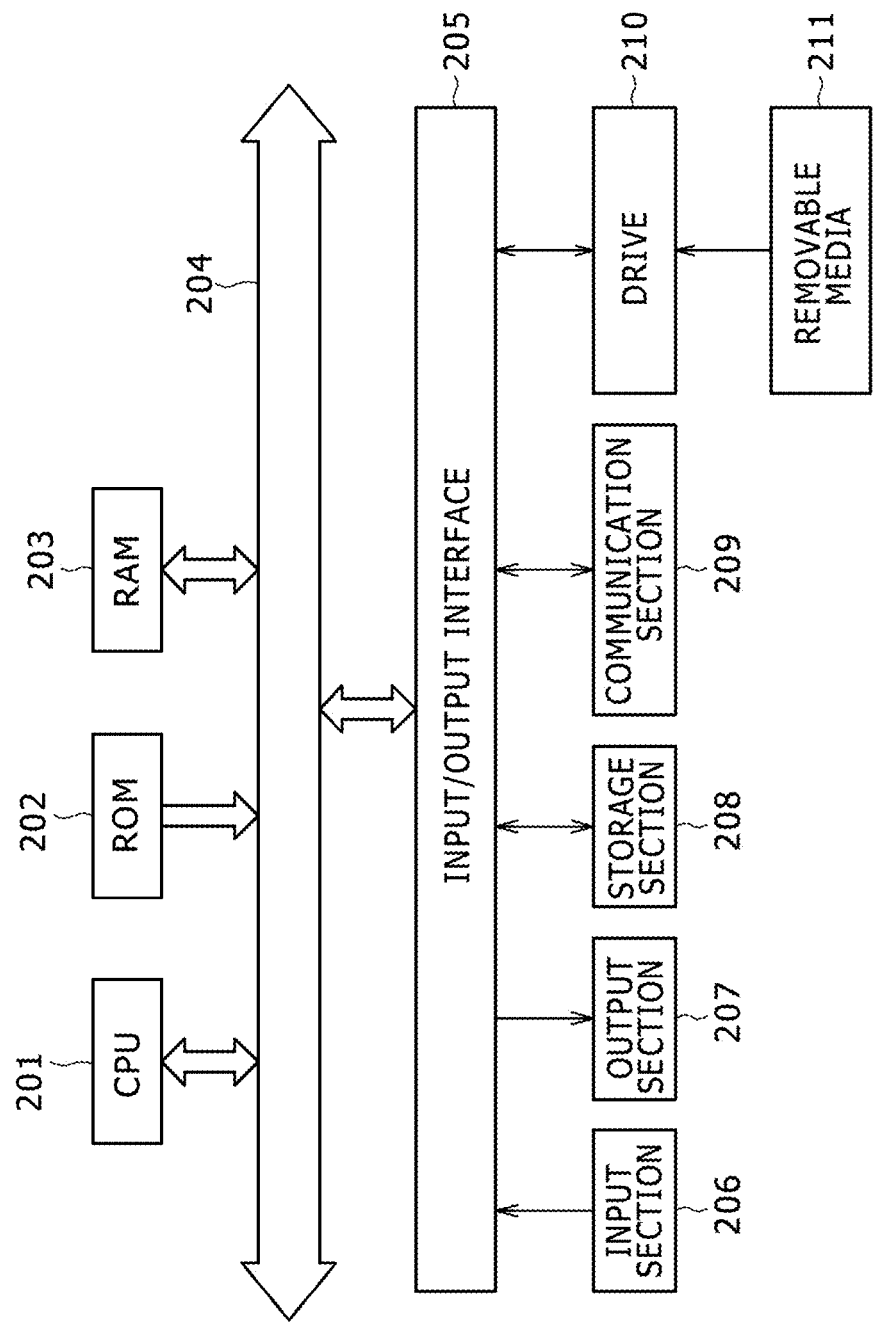

IMAGING DEVICE, IMAGING METHOD, ELECTRONIC APPARATUS, AND ONBOARD ELECTRONIC APPARATUS

CROSS-REFERENCE TO RELATED APPLICATIONS

This application claims the benefit under 35 U.S.C. § 371 as a U.S. National Stage Entry of International Application No. PCT/JP2016/059550, filed in the Japanese Patent Office as a Receiving Office on Mar. 25, 2016, which claims priority to Japanese Patent Application Number JP 2015-079679, filed in the Japanese Patent Office on Apr. 9, 2015, each of which is hereby incorporated by reference in its entirety.

TECHNICAL FIELD

The present disclosure relates to an imaging device, an imaging method, an electronic apparatus, and an onboard electronic apparatus. More particularly, the present disclosure relates to an imaging device, an imaging method, an electronic apparatus, and an onboard electronic apparatus for suppressing the flicker caused by light sources over a wide range of frequencies.

BACKGROUND ART

There is a phenomenon in which light-emitting diode (LED) light bulbs such as traffic lights appear to remain unlit for an extended period of time when recorded as a video, typically in fine weather where shutter speeds tend to be lower. The phenomenon hinders this kind of videos recorded with an onboard camera from serving as evidence of a traffic accident. Furthermore, this phenomenon has turned out to be an impediment to the recent trend of making vehicles intelligent.

LEDs are lit and unlit at very high frequencies. The above-mentioned phenomenon occurs when the emission frequency of the LEDs is close to the imaging frequency in use. There has been proposed a drive recorder that acquires data at a frame rate higher than that of its output, recognizes a traffic signal, detects the blinking frequency of the traffic signal, and selects frames in which the LEDs are lit (see PTL 1).

Also proposed is an imaging device that acquires data at a frame rate higher than that of its output and selects frames randomly, thereby preventing the imaged bulbs from appearing to be unlit for an extended time period (see PTL 2).

CITATION LIST

Patent Literature

[PTL 1]
    JP 2008-211442 A
[PTL 2]
    JP 2009-17293 A

SUMMARY

Technical Problem

However, the proposed techniques cited above may render the movement of an imaged moving body unnatural or let low-frequency flicker get higher in frequency.

The present disclosure has been devised in view of the above circumstances and aims to suppress the flicker caused by light sources over a wide range of frequencies.

Solution to Problem

According to one aspect of the present disclosure, there is provided an imaging device including an imaging section configured to generate an image of an object by focusing light coming therefrom, and an imaging control section configured to unevenly change a capture interval between the images generated by the imaging section in a single-frame period.

The imaging control section may be configured to have at least three images captured in the single-frame period.

The imaging control section may be configured to gradually change the capture interval between the images generated in the single-frame period.

The imaging control section may be configured to gradually increase the capture interval between the images generated in the single-frame period.

The imaging control section may be configured to gradually decrease the capture interval between the images generated in the single-frame period.

The capture interval between the images may correspond to a blinking interval of a frequency band ranging from 50 to 600 Hz.

The capture interval between the images may correspond to the blinking interval of a frequency band ranging from 50 to 300 Hz.

The capture interval between the images may correspond to the blinking interval of a frequency band ranging from 50 to 120 Hz.

The imaging control section may be configured to provide the same pattern of the capture intervals between the images for each frame.

The imaging device may further include an image blending section configured to blend the images generated by the imaging section.

The image blending section may be configured to blend the images generated by the imaging section using a predetermined weight.

The imaging control section may be configured to change a frame rate in accordance with light and darkness. The image blending section may be configured to blend the images generated by the imaging section using a weight reflecting the frame rate changed by the imaging control section.

The imaging control section may be configured to lower the frame rate in accordance with darkness. The image blending section may be configured to blend the images generated by the imaging section using a weight reflecting the frame rate changed by the imaging control section.

According to another aspect of the present disclosure, there is provided an imaging method including causing an imaging device to generate an image of an object by focusing light coming therefrom, and causing the imaging device to unevenly change a capture interval between the images generated in a single-frame period.

According to a further aspect of the present disclosure, there is provided an electronic apparatus including an imaging device that includes an imaging section configured to generate an image of an object by focusing light coming therefrom, and an imaging control section configured to unevenly change a capture interval between the images generated by the imaging section in a single-frame period.

According to an even further aspect of the present disclosure, there is provided an onboard electronic apparatus including an imaging device that includes an imaging section configured to generate an image of an object by focusing light coming therefrom, and an imaging control section configured to unevenly change a capture interval between the images generated by the imaging section in a single-frame period.

Thus according to one aspect of the present disclosure, an image of an object is generated by focusing light coming therefrom. In a single-frame period, the capture interval between the generated images is changed unevenly.

The above-outlined imaging device may be either an independent imaging device or an internal block constituting part of a single imaging device.

Advantageous Effects of Invention

According to one aspect of the present disclosure, it is possible to suppress the flicker over a wide range of frequencies and to reduce the unnatural movement of an imaged moving body.

The advantageous effects outlined above are only examples and not limitative of the present disclosure. Further advantages will become apparent from a reading of the present disclosure.

BRIEF DESCRIPTION OF DRAWINGS

FIG. 10 is an explanatory diagram explaining frequencies of LED light sources.

FIG. 11 is a schematic diagram depicting an example of covering all types of LED light sources (use case 1).

FIG. 15 is a block diagram depicting a hardware configuration example of a computer.

DESCRIPTION OF EMBODIMENTS

Described below are the preferred modes for implementing the present disclosure (called the embodiments hereunder). The description will be given under the following headings:

0. Overview
1. First Embodiment (imaging device)
2. Second Embodiment (target frequencies)
3. Third Embodiment (computer)

0. Overview

When LED light bulbs such as traffic lights are recorded as a video, there may occur a phenomenon in which the light bulbs appear to be unlit for an extended period of time, typically in fine weather where shutter speeds tend to be lower. With LEDs blinking at a very high frequency, the above-mentioned phenomenon occurs when the emission (blinking) frequency of the LEDs is close to the imaging frequency in use.

The principle on which an LED light bulb appears to be unlit when imaged is explained with reference to FIG. 1. An example is described below in which, at 60 fps per frame (frm), an LED light bulb as a typical light source of flicker blinks at cycles of 60 Hz and 600 Hz.

In normal imaging, capture timing is once per frame (frm), for example. If imaging takes place once per frame (frm) as in normal imaging, the unlit timing of the LED light bulb with its blinking cycle is synchronized with the capture timing as depicted in Subfigure A in FIG. 1. As a result, the LED light bulb appears to be always unlit when imaged.

PTL 1 proposes the technique by which imaging is performed at high speed to detect an LED and to select the lit frames thereof. Subfigure B in FIG. 1 depicts an example of the technique for detecting the LED. With this technique, it is also proposed that in high-speed imaging, the capture timing be staggered randomly as indicated by symbol Δt.

For example, in the left-side frame, three images are randomly captured. Of these images, only the one captured for the third time is lit at the blinking cycles of 60 Hz and 600 Hz. Thus, the lit image is selectively output. Likewise, in the right-side frame, four images are randomly captured. Of these images, only the one captured for the fourth time is lit at the blinking cycles of 60 Hz and 600 Hz, so that this image is selectively output.

Figure 1:
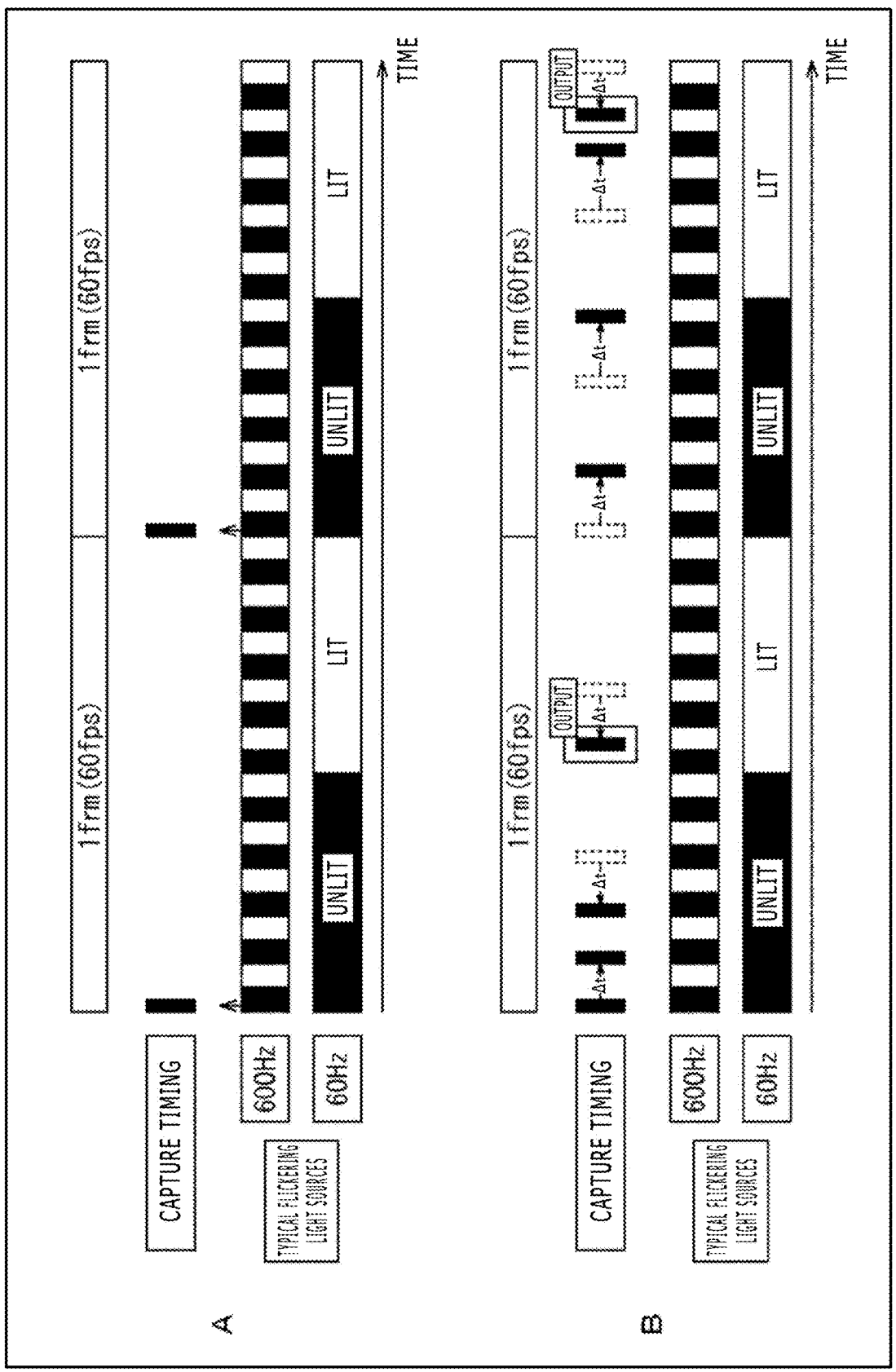
FIG. 1 is an explanatory diagram explaining the principle on which an LED light bulb appears to be unlit when imaged.

However, according to the technique for detecting the LED depicted in Subfigure B in FIG. 1, the movement of the imaged moving body appears to be unnatural, or low-frequency flicker gets higher in frequency. Also according to the technique for detecting the LED depicted in Subfigure B in FIG. 1, the process of detecting an LED light source is costly. In addition, high power consumption is required for taking a video at a high frame rate, further entailing heat generation.

In commercializing that technique, it is essential to perform control such that high-speed consecutive capture is performed only if a normally taken video incurs long-cycle flicker and that a quick transition is made to normal imaging if otherwise. However, there are no proposals as to how to achieve that transition.

Figure 2:
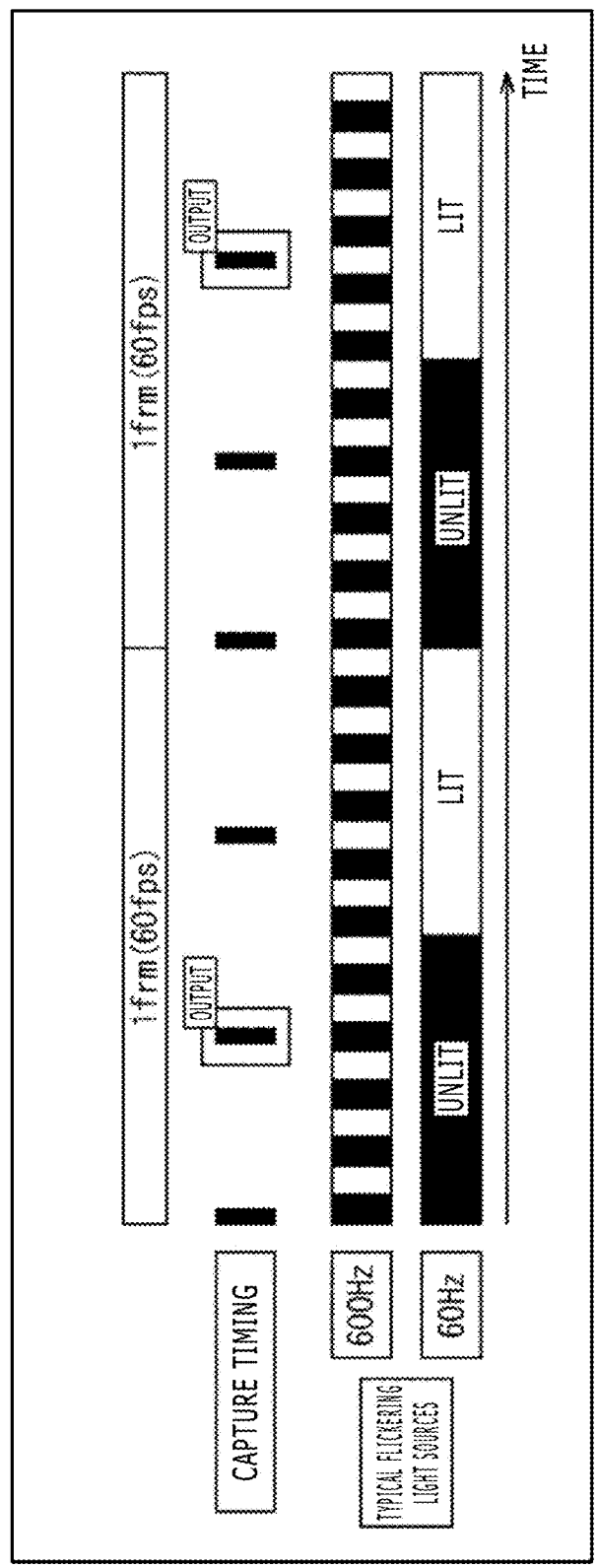
FIG. 2 is an explanatory diagram explaining an example of another technology.

PTL 2 proposes the technique by which images are captured at high speed and selected randomly. FIG. 2 depicts an example of the technique for capturing images at high speed for subsequent random image selection.

For example, three images are captured per frame. In the left-side frame, the second captured image from left is selectively output. In the right-side frame, the third captured image from left is selectively output. With the captured images randomly selected, the image selected in the left-side frame is unlit at the blinking cycles of 60 Hz and 600 Hz whereas the image selected in the right-side frame is lit at the blinking cycles of 60 Hz and 600 Hz. This is how the LED is prevented from appearing to be unlit for an extended time period when imaged.

However, according to the technique for imaging at high speed followed by random image selection depicted in FIG. 2, as in the case of Subfigure B in FIG. 1, the movement of the imaged moving body appears to be unnatural or low-frequency flicker gets higher in frequency. Also according to the technique for high-speed imaging with subsequent random image selection depicted in FIG. 2, high power consumption is required for taking a video at a high frame rate, which entails heat generation.

Figure 3:
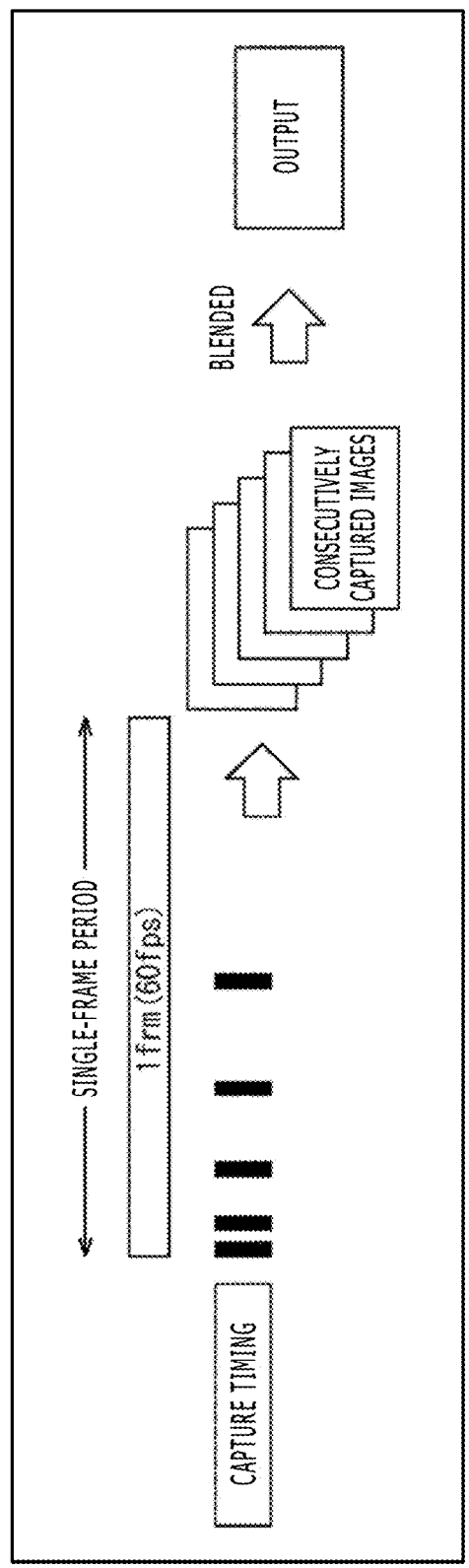
FIG. 3 is an explanatory diagram explaining an outline of the present technology.

Thus according to the present technology, as depicted in FIG. 3, multiple (five in the case of FIG. 3) images are captured consecutively at uneven intervals in a single-frame period of a video before being blended. At least three images are preferably captured consecutively. This efficiently eliminates flicker.

The uneven capture timing in the single-frame period depicted in FIG. 3 is made the same for multiple frames. This makes it possible to prevent low-frequency flicker from getting higher in frequency.

(Description of the Key Point of the Present Technology)

Figure 4:
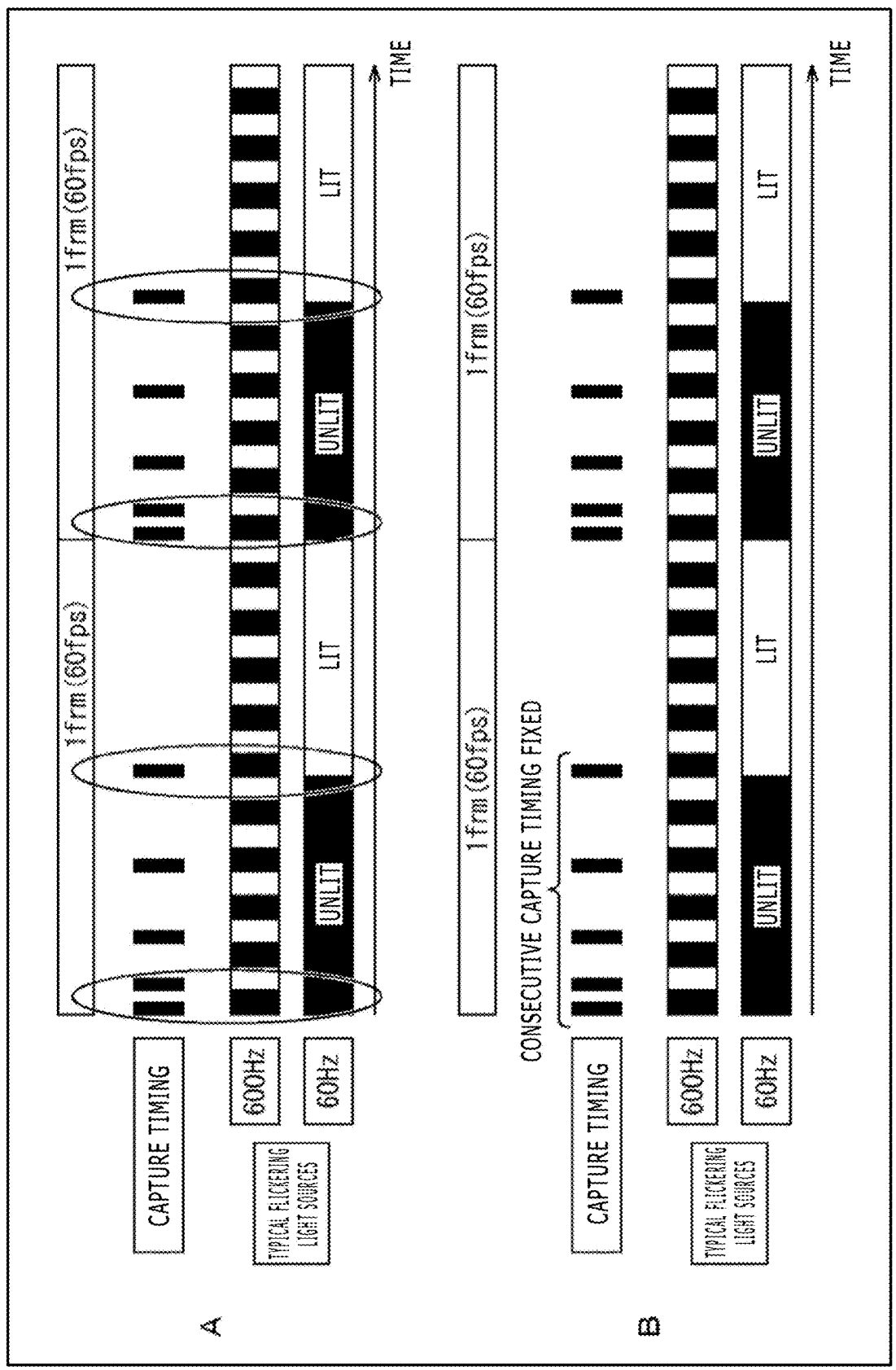
FIG. 4 is an explanatory diagram explaining the present technology in more detail.
Figure 5:
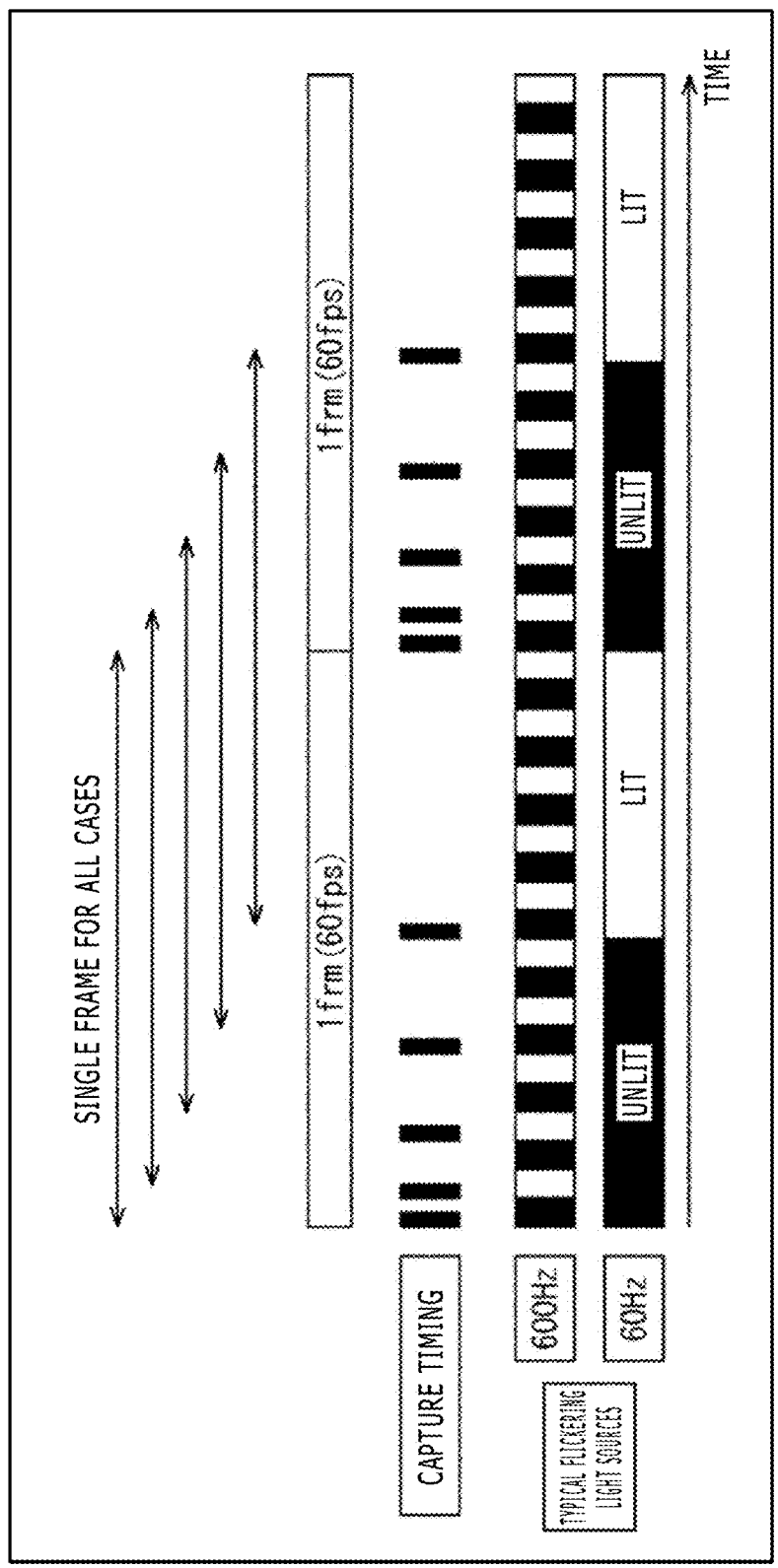
FIG. 5 is another explanatory diagram explaining the present technology in more detail.

The key point of the present technology is described below in detail with reference to FIGS. 4 and 5. FIGS. 4 and 5 depict capture timing at uneven intervals at which multiple images are captured consecutively in a single-frame period according to the present technology, the intervals being the same for multiple frames.

As depicted in Subfigure A in FIG. 4, the present technology has no need for light source detection or for flicker frequency detection and is effective over a wide range of frequencies. Specifically, the present technology involves capturing multiple images consecutively at uneven intervals in the single-frame period of a video. Thus with both a $1/1200$-second interval and a $1/120$-second interval included in the capture timing as depicted enclosed by circles in Subfigure A in FIG. 4, it is possible to sample lit-unlit flicker caused by the LED light source at the two frequencies.

According to the technique for detecting the LED as described above with reference to Subfigure B in FIG. 1, or according to the technique for high-speed imaging followed by random image selection as discussed above with reference to FIG. 2, the capture intervals between the frames to be output are uneven. It follows that when a body doing a uniform linear motion is imaged for example, the imaged body appears to be making an unnatural movement instead of the uniform linear motion.

According to the present technology, by contrast, the moving body appears to move naturally when imaged. That is, the present technology involves fixing the consecutive capture timing for each frame so that obtained frames are blended at an approximately fixed blending ratio for each frame, as depicted bracketed in Subfigure B in FIG. 4.

That means the pattern of the bracketed consecutive capture timing and the blending ratio of the respective captured images remain substantially unchanged between adjacent frames. This prevents the movement of the imaged body from becoming unnatural. The blending ratio is changed seamlessly using a time constant, as will be discussed later in more detail.

Also according to the technique for high-speed imaging followed by random image selection as described above with reference to FIG. 2, there occurs frequently the case where frames are randomly output from those captured at high speed, so that lighting and unlighting of the LED vary from one frame to another (this phenomenon is called high-frequency flicker).

According to the present technology, by contrast, the interval between frames of the respective images captured at high speed for use in generating output frames is the same as that of a single-frame period as depicted arrows in FIG. 5. This leads to all images getting long-cycle flicker. Blending multiple images with long-cycle flicker each only generates low-frequency flicker. Thus the present technology prevents long-cycle flicker from getting higher in frequency. Incidentally, if high-frequency flicker is present from the start, it is not targeted for suppression.

Figure 6:
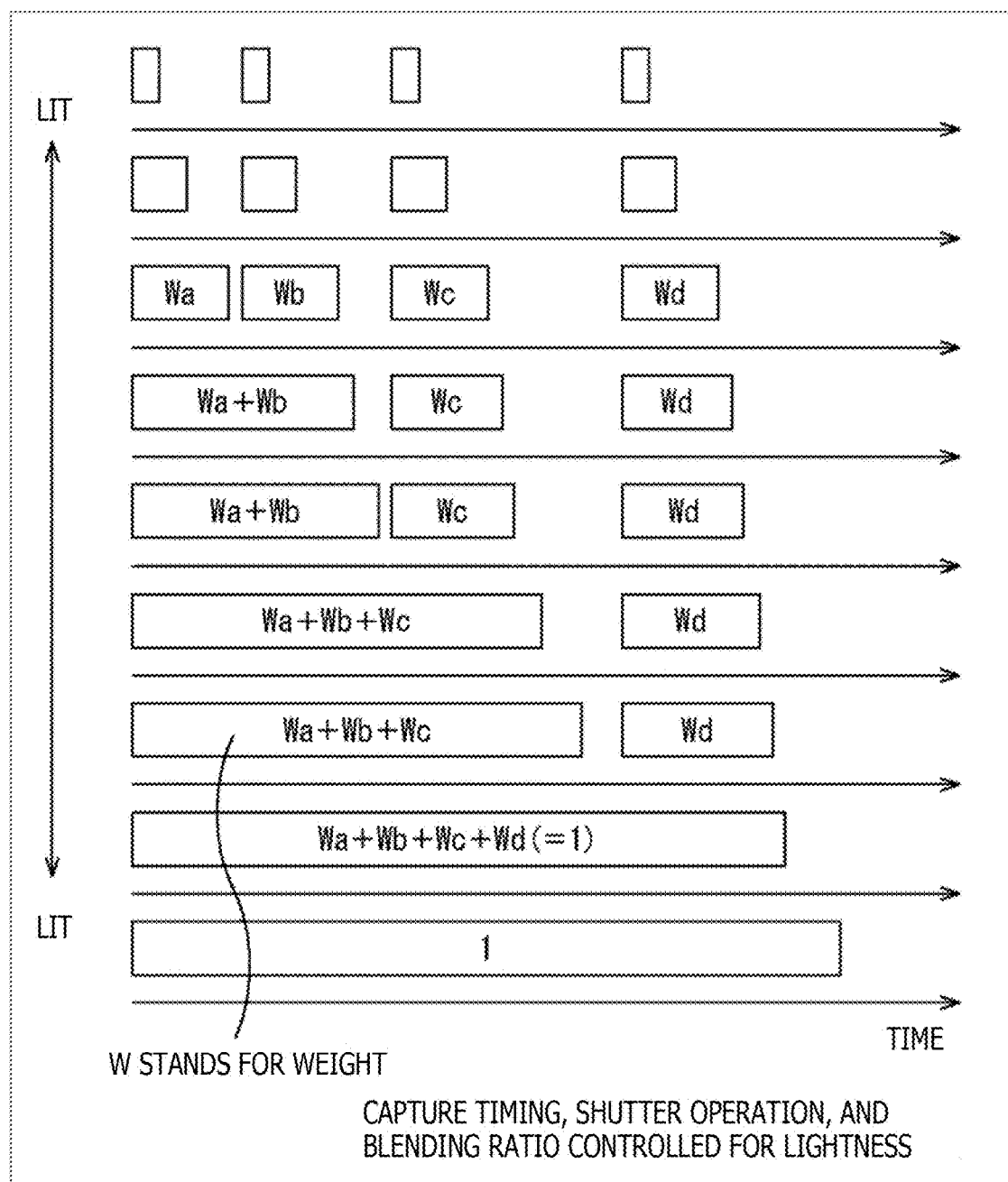
FIG. 6 is an explanatory diagram explaining a process performed in accordance with light and darkness of the surroundings.

Also according to the present technology, under light conditions where LED flicker takes place as depicted in FIG. 6, high-speed imaging and image blending currently suppress LED flicker. As it is getting darker, control is performed to lower the frame rate for high-speed imaging. When the frame rate is lowered, the blending ratio of the images captured at high speed is controlled in a manner preventing changes of the frame rate from appearing in the images. Control is also performed to change the ratio (weights) of the images captured at high speed using a time constant.

Also according to the present technology, normal exposure control is performed after the frame rate becomes the same as that of normal single-image capture replacing consecutive capture.

FIG. 6 depicts an example of controlling the capture timing at which four images are captured at high speed while the ambient lightness is changed, the shutter operations involved, and the blending ratio in use. Where the surroundings are light as indicated by the first to the third row from the top in FIG. 6, four images are captured at high speed. These images are weighted by Wa, Wb, Wc, and Wd in order from left to right before being blended. Where the surroundings are darker as indicated by the fourth and the fifth row from the top in FIG. 6, control is performed to lower the frame rate. With the first and the second image from left constituting a single image so that three images are captured at high speed, these images are weighted by Wa+Wb, Wc, and Wd in order from left to right before being blended.

Where the surroundings are still darker as indicated by the sixth and the seventh row from the top in FIG. 6 with the frame rate controlled to be lowered still, the first to the third image from left constitute a single image, so that two images are captured at high speed. In this case, the images are weighted by Wa+Wb+Wc and Wd in order from left to right before being blended. Where the surroundings are further darkened as indicated by the eighth and the ninth row from the top in FIG. 6 with the frame rate controlled to be further lowered, the first to the fourth image from left constitute a single captured image. In this case, the captured image is weighted by Wa+Wb+Wc+Wd (=1) before being output.

As described above, the present technology controls the capture timing applicable when the ambient lightness is changed, the shutter operations involved, and the blending ratio in use. This provides seamless transition of control from the frame rate of high-speed imaging for countering flicker to the normal frame rate.

The present technology is described below in more specific terms.

1. First Embodiment (Configuration Example of the Imaging Device)

Figure 7:
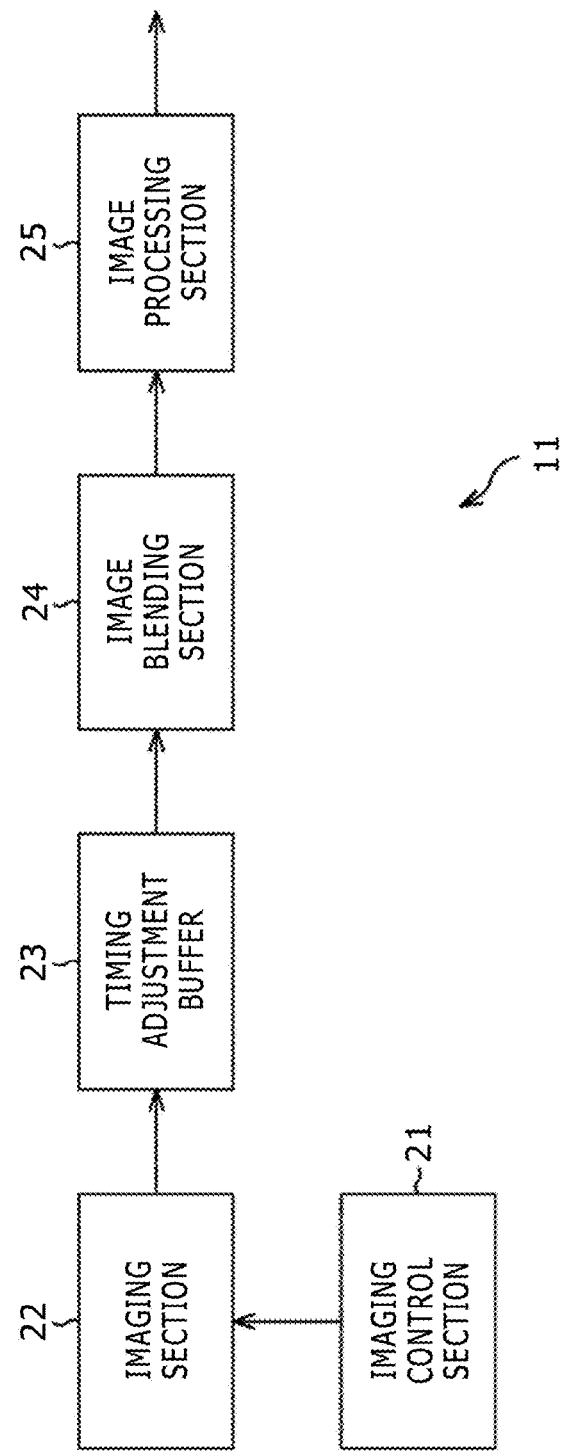
FIG. 7 is a block diagram depicting a typical configuration example of an imaging device to which the present technology is applied.

FIG. 7 is a block diagram depicting a typical configuration example of an imaging device to which the present technology is applied.

An imaging device 11 is configured to include an imaging control section 21, an imaging section 22, a timing adjustment buffer 23, an image blending section 24, and an image processing section 25.

The imaging control section 21 controls acquisition of image data by the imaging section 22 at a cycle higher than the frame rate for output (e.g., 30 fps or 60 fps). For purpose of explanation, reference character n is used in the ensuing paragraphs to indicate the period that is half the blinking cycle of the LED light source generating LED flicker.

The imaging control section 21 controls the imaging section 22 in a manner making the capture intervals uneven in an output single-frame period. Specifically, the imaging control section 21 acquires multiple images captured at high speed while gradually extending the capture interval by an integral multiple of n in the output single-frame period. For example, in the example of FIG. 9, as will be discussed later, images are consecutively captured at intervals of n, 2n, 2n, and 3n in the output single-frame period so that the captured images are weighted at a ratio of 3:2:2:1 before being blended. This makes it possible, at all frequencies, to reduce by half the amplitude of the flicker generated by the LED having a cycle longer than 2n. The capture interval may be changed in monotonic increase, in monotonic decrease, from decrease to increase, or from increase to decrease. For higher effectiveness, monotonic increase or monotonic decrease is preferred.

The imaging control section 21 control the imaging section 22 in such a manner that the exposure time for each of the images captured at high speed is the same for the same output frame, the exposure time being made to be as long as that of normal video imaging (one frame captured, one frame output). Where the exposure time becomes longer (where the target to be captured is darker), the imaging control section 21 performs control to lower the frame rate at which the imaging section 22 captures images at high speed, thereby making seamless transition of control to normal video imaging as discussed above with reference to FIG. 6.

The imaging section 22 is configured to include an optical system and an image sensor. The optical system is formed by a diaphragm, lenses, a shutter and other parts for focusing an appropriate image on the image sensor, and the image sensor receives light that passes through the optical system and converts the received light into an electrical signal. Note that there are no particular constraints on the image sensor (e.g., as to its light-receiving system and color filter type) except that it is formed by a complementary metal oxide semiconductor (CMOS) solid-state imaging device and capable of being controlled by the imaging control section 21.

The imaging section 22, under control of the imaging control section 21, converts light from an object into electrical signals and feeds images of the converted electrical signals to the timing adjustment buffer 23.

The timing adjustment buffer 23 accumulates multiple images captured at high speed for single-frame output. The timing adjustment buffer 23 outputs the images in parallel to the image blending section 24 in accordance with the frame rate for output.

The image blending section 24 blends (synthesizes) at a predetermined ratio the multiple captured images that are input in parallel, and outputs an image resulting from the blending to the image processing section 25. Specifically, the image blending section 24 sets a factor such that LED flicker is minimized in accordance with the capture timing controlled by the imaging control section 21. The image blending section 24 controls the weight of each of the images captured at high speed in keeping with the control for lowering the frame rate for the images captured at high speed as the exposure time becomes longer. Furthermore, the image blending section 24 performs control to change seamlessly the weight of each of the images captured at high speed using a time constant for image quality adjustment.

The image processing section 25 performs signal processing on the images from the image blending section 24 and outputs the processed images to a downstream stage. Incidentally, one or multiple image processing sections 25 may be inserted anywhere downstream of the imaging section 22. However, if the image processing section 25 is inserted downstream of the timing adjustment buffer 23, the image processing section 25 is arranged preferably upstream of the timing adjustment buffer 23 or downstream of the image blending section 24 in view of the need for providing as many processing blocks as the number of images captured at high speed. This arrangement helps save hardware costs.

(Processing Example of the Imaging Device)

Figure 8:
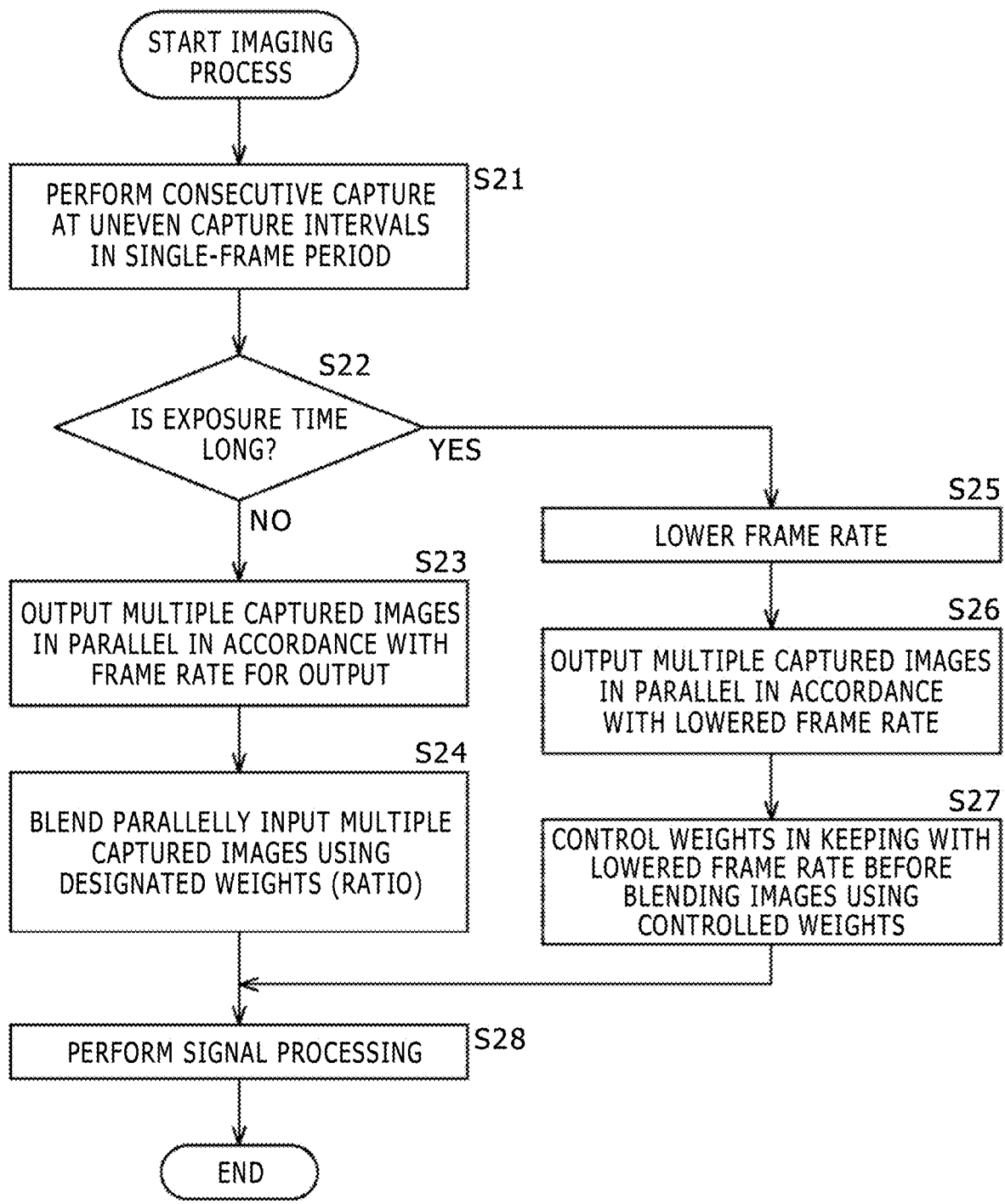
FIG. 8 is a flowchart explaining an imaging process performed by the imaging device.

An imaging process of the imaging device 11 is described below with reference to the flowchart of FIG. 8.

In step S21, the imaging control section 21 controls the imaging section 22 to perform consecutive capture at uneven intervals in an output single-frame period. Under control of the imaging control section 21, the imaging section 22 converts the light from an object into an electrical signal, and feeds an image of the converted electrical signal to the timing adjustment buffer 23. Multiple images captured at high speed are input in parallel to the timing adjustment buffer 23 from the imaging section 22.

In step S22, the imaging control section 21 determines whether or not exposure time is long. If it is determined in step S22 that the exposure time is not long, control is transferred to step S23. In step S23, the timing adjustment buffer 23 outputs in parallel the multiple captured images input from the imaging section 22 in accordance with the frame rate for output.

In step S24, the image blending section 24 blends (synthesizes) the parallelly input multiple images captured at high speed using predetermined weights (at a predetermined ratio), and outputs an image resulting from the blending to the image processing section 25.

On the other hand, if it is determined in step S22 that the exposure time is long, control is transferred to step S25. In step S25, the imaging control section 21 lowers the frame rate.

In step S26, the timing adjustment buffer 23 outputs in parallel the multiple captured images input from the imaging section 22 in accordance with the frame rate lowered by the imaging control section 21.

In step S27, the image blending section 24 controls (adjusts) the weights in accordance with the lowered frame rate, blends (synthesizes) the multiple images captured at high speed and input in parallel using the controlled weights, and outputs an image resulting from the blending to the image processing section 25.

After step S24 or step S27, control is transferred to step S28. In step S28, the image processing section 25 performs image processing on the image from the image blending section 24 and outputs the processed image to a downstream stage.

Note that the foregoing paragraphs described the case where images captured at staggered timing are input from a single optical system and a single imaging section. Alternatively, multiple optical systems and multiple imaging sections may be provided, and images captured at staggered timing may be input from the multiple optical systems.

As another alternative, with one optical system provided, the same effects are obtained when the capture timing is staggered in units of a specific region such as pixels or lines on the imaging plane of the imaging section before blending. If the capture timing is changed within the imaging plane in this manner, the pixels corresponding to the frames of which the imaging is determined to be unnecessary for the above-mentioned lightness-based frame rate control may be subjected to the same control as that for the pixels not corresponding to the frames of which the imaging is determined to be unnecessary. This contributes to improving the resolution of images.

During wide dynamic range (WD) video imaging, long-exposed and short-exposed images are captured consecutively at high speed at staggered timing. This provides control for removing long-cycle flicker from either or both of the long-exposed and the short-exposed images.

Also, the positions of images may be aligned during high-speed consecutive capture.

Furthermore, the image blending section 24 may have multiple sets of weighting factors for the images captured consecutively, and blend the images using these sets of weighting factors before further blending the blended images using desired weights for seamless switching of the weighting factor sets.

According to the present technology, as described above, very simple signal processing involving the imaging at staggered timing and the blending of images reduces the amplitude of the flicker caused by flickering light sources over a wide range of frequencies.

In particular, where traffic signals and LED signs trigger long-cycle flicker, the phenomenon of lights disappearing with no flicker is prevented.

In a video, the unnatural movement of an imaged moving body such as random contraction or elongation is suppressed.

Further according to the present technology, seamless transition is made possible between normal video capture mode and long-cycle flicker countermeasure mode in accordance with lightness. Of the scenes where long-cycle flicker does not occur, only those needed can be addressed with approximately the same power consumption and heat generation as in normal video capture.

(Advantageous Effects of the Present Technology)

Figure 9:
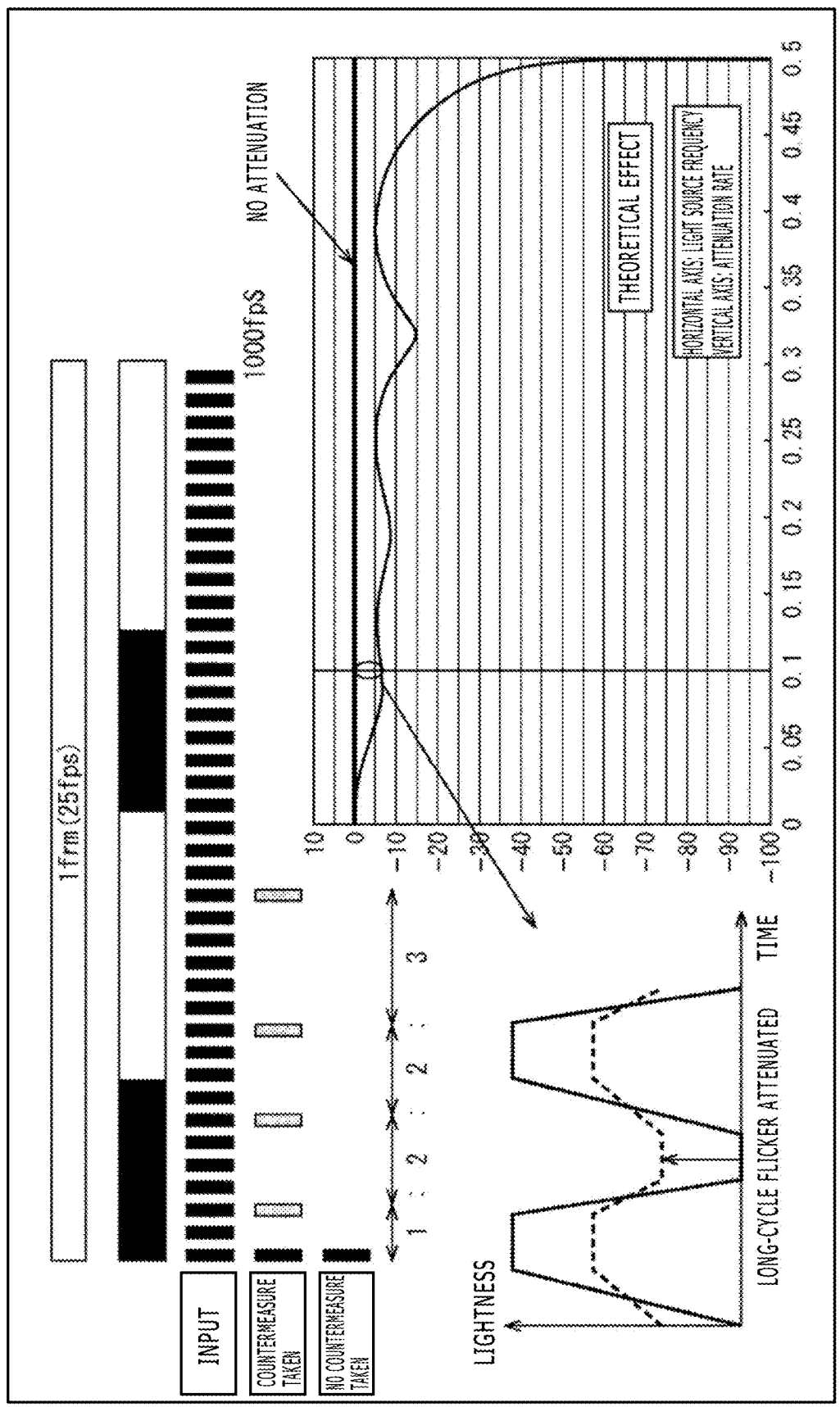
FIG. 9 is an explanatory diagram explaining advantageous effects of the present technology.

FIG. 9 is an explanatory diagram explaining advantageous effects of the present technology.

FIG. 9 depicts an example of experiment in which images of 1000 fps are input from the imaging device 11 for a process resulting in images generated at 25 fps. This example is equivalent to the case of outputting images of 30 fps out of images of 600 fps. With no countermeasure taken as depicted in FIG. 9, an image is captured at the beginning of an output single frame, so that an unlit-period of the LED light source is output. According to the present technology, by contrast, images are captured consecutively at intervals of n, 2n, 2n, and 3n (n=2) in an output single-frame period before being blended at a weight ratio of 3:2:2:1, for example.

In a graphic representation at bottom right in FIG. 9, the horizontal axis denotes the blinking frequencies of light sources and the vertical axis represents the attenuation rates (dB) at which the lightness of signals is attenuated by the processing. In another graphic representation at bottom left in FIG. 9, the vertical axis stands for lightness and the horizontal axis for time. As indicated by solid lines in the graph, a signal entailing LED flicker repeats a state of being lit followed by a state of being unlit some time later. In the bottom-right graph, the portion indicated by a circle has an attenuation rate of approximately −6 dB, which is equivalent to ½ times. Transcribing the attenuation ratio to the bottom-left graph gives approximately half the amplitude of lightness, as indicated by broken lines. It can be seen that the signal that was fully unlit before is now half lit.

It follows that the light (lit) portion of the traffic signal that was fully unlit due to the attenuation of the amplitude of long-cycle flicker is restored to a level of lightness high enough for appropriate visual recognition.

Thus according to the preset technology, multiple images are captured consecutively at uneven intervals in a single-frame period of a video before being blended. This process makes it possible to remove flicker.

Also, multiple images for use in generating an output single frame are captured at unevenly staggered timing. This, compared with the case of evenly staggered timing, removes flicker efficiently.

Furthermore, multiple images for use in generating each frame are captured at the same timing for output multiple frames. This makes it possible to prevent low-frequency flicker from getting higher in frequency.

What follows is a description of the target frequencies to which the present technology is applied.

2. Second Embodiment (Target Frequencies)

Basically, the blinking frequency of a light source is an integral multiple of the frequency of its power supply. In the case of Japan, the power supply frequency is 50 Hz in eastern Japan and 60 Hz in western Japan. Globally, the power supply frequency is either 50 Hz or 60 Hz as well.

As depicted in FIG. 10, the LED light sources captured by onboard cameras fall into three broad categories: traffic signals, signs, and onboard LED lights. According to surveys, most traffic signals blink at 100 Hz or at 120 Hz but the signs and onboard LEDs are so diverse in type that their frequencies are difficult to determine (the frequencies tend to be multiples of 60 or 90 between 500 Hz and 100 Hz).

FIG. 11 is a schematic diagram depicting an example of covering all types of LED light sources (use case 1). Where all types of LED light sources are addressed, it is necessary to cover frequencies ranging from 600 to 50 Hz including margins.

In this case, advantageous effects are obtained when, for example, five images are captured consecutively at varying capture intervals of n, 2n, 2n, and 3n where n stands for a minimum capture interval of $\frac{1}{1200}$ second, the images being weighted at a ratio of 3:2:1:1:1 before being blended.

Figure 12:
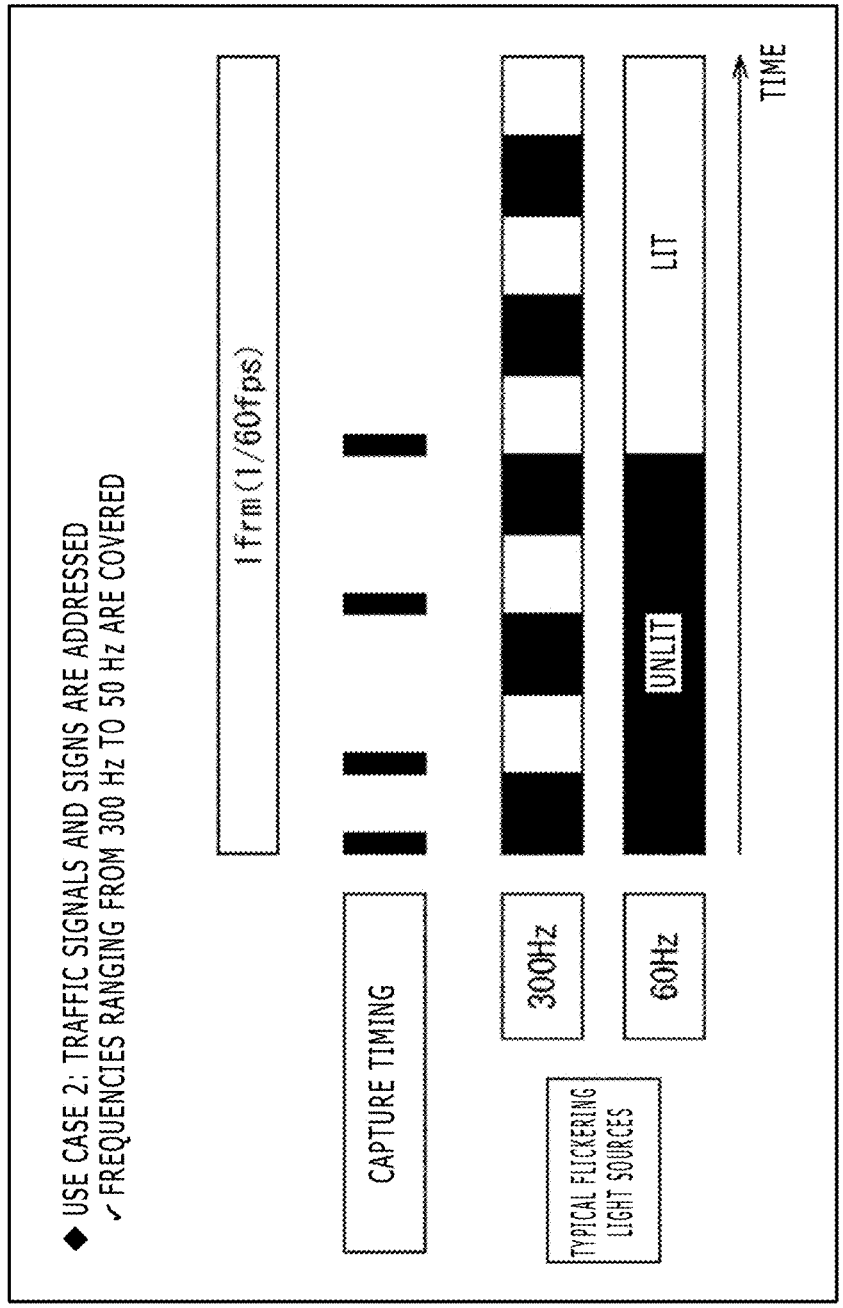
FIG. 12 is a schematic diagram depicting an example of addressing traffic signals and signs (use case 2).

FIG. 12 is a schematic diagram depicting an example of addressing traffic signals and signs (use case 2). Where the traffic signals and signs are addressed, it is necessary to cover frequencies ranging from 300 to 50 Hz.

In this case, advantageous effects are obtained when, for example, four images are captured consecutively at varying capture intervals of n, 2n, and 2n where n stands for a minimum capture interval of $\frac{1}{600}$ second, the images being weighted at a ratio of 3:2:1 before being blended.

Figure 13:
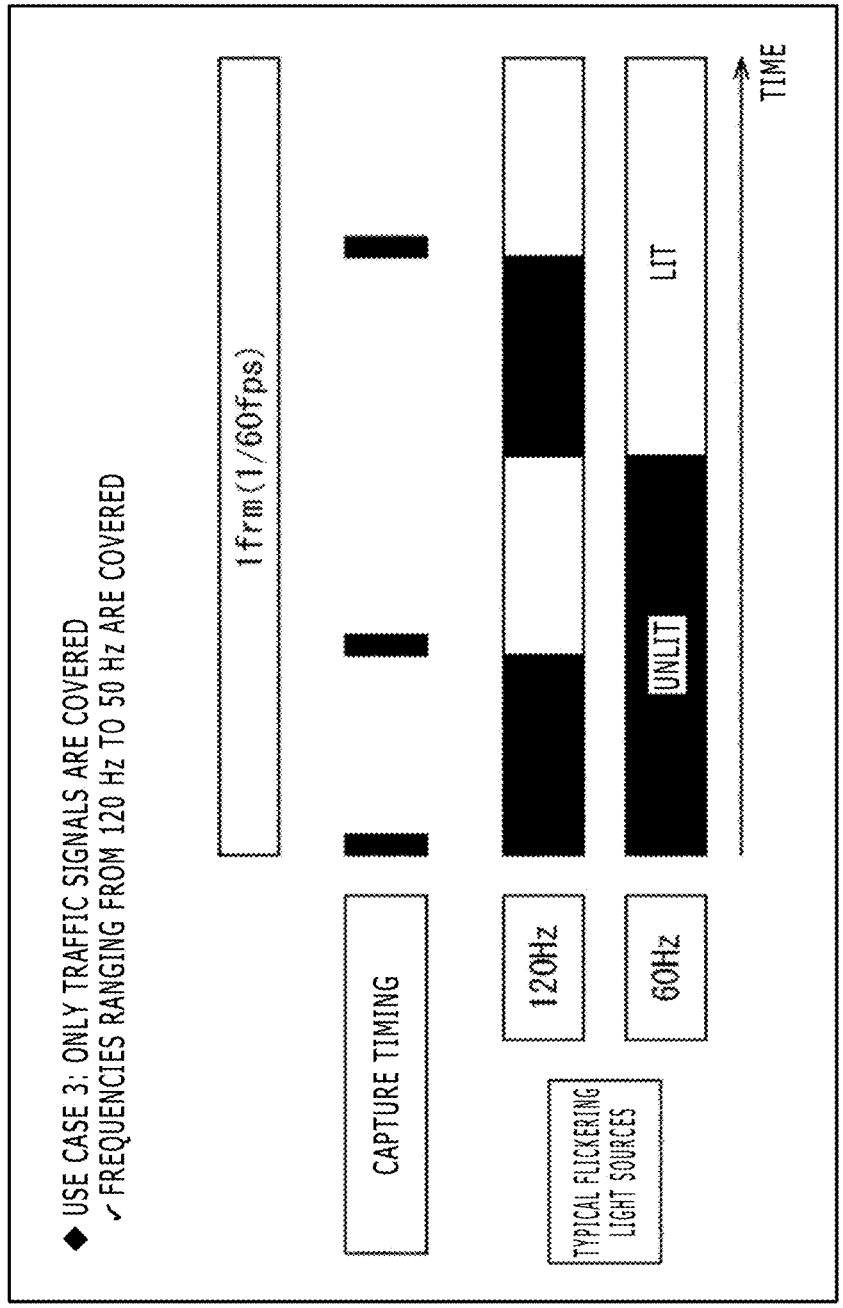
FIG. 13 is a schematic diagram depicting an example of addressing traffic signals (use case 3).

FIG. 13 is a schematic diagram depicting an example of addressing traffic signals (use case 3). Where the traffic signals are addressed, it is necessary to address frequencies ranging from 120 to 50 Hz.

In this case, advantageous effects are obtained when, for example, three images are captured consecutively at varying capture intervals of n and 2n where n stands for a minimum capture interval of $\frac{1}{240}$ second, the images being weighted at a ratio of 2:1:1 before being blended.

Whereas specific examples are depicted in FIGS. 11 to 13, the capture intervals and blending ratios may be other than those given in the examples.

Figure 14:
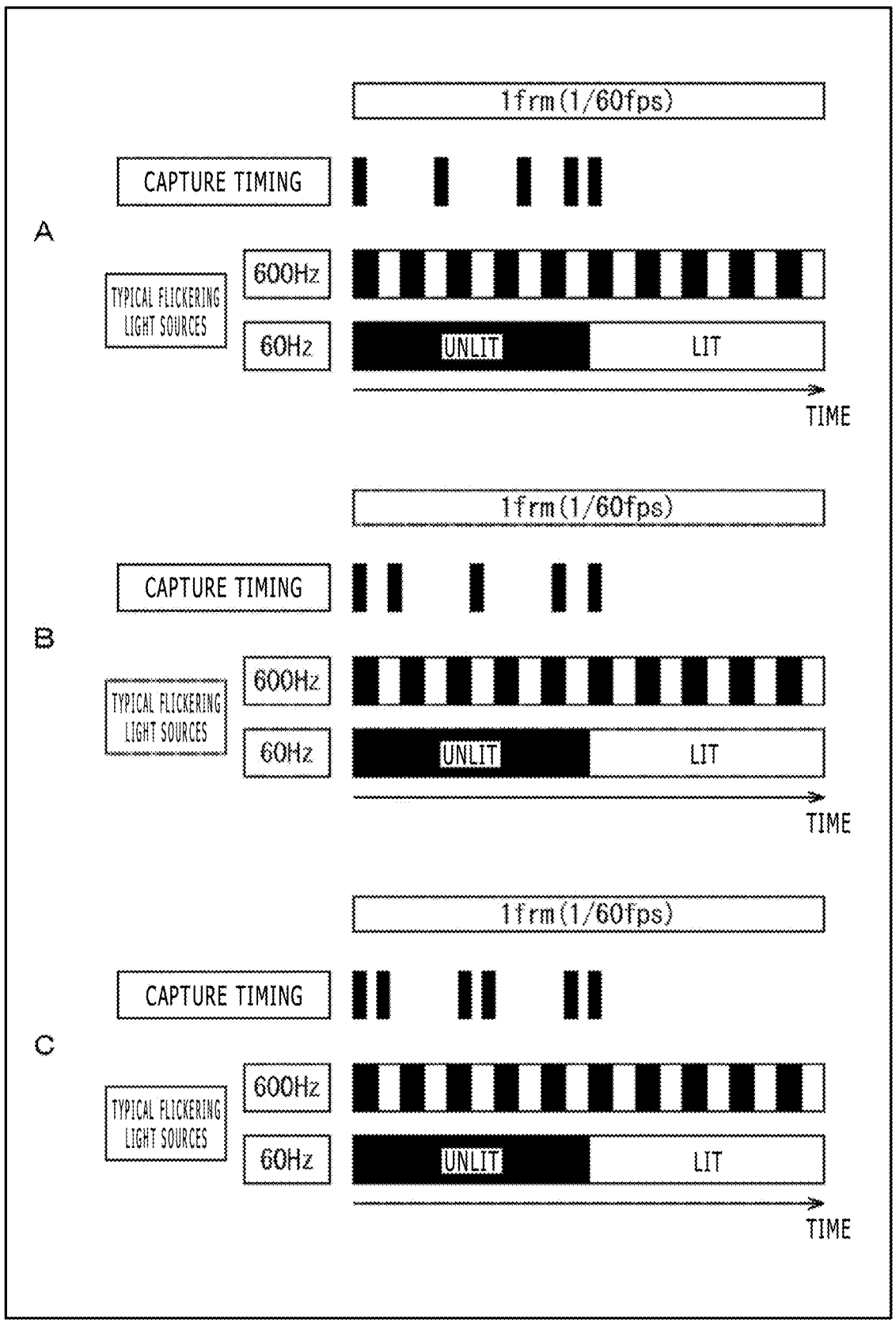
FIG. 14 is a schematic diagram depicting a variation of use case 1.

Take use case 1 for example. As depicted in Subfigure A in FIG. 14, the capture interval is not limited to monotonic increase; it may be monotonic decrease instead. Alternatively, as depicted in Subfigure B in FIG. 14, the capture interval may be shifted from monotonic decrease to monotonic increase. In another alternative, as depicted in Subfigure C in FIG. 14, the capture interval may be a combination of short, consecutive capture intervals.

It is to be noted, however, that changing the capture interval in monotonic increase or in monotonic decrease is most efficient. Further, multiple frequency bands can be addressed if the capture interval is gradually increased.

In the foregoing paragraphs, it was explained that the image sensor in the imaging section is configured to use a CMOS solid-state imaging device. Alternatively, the image sensor may be configured to use some other solid-state imaging device such as a charge-coupled device (CCD) imager.

The present technology may be applied to imaging devices including surveillance cameras, onboard cameras, and other imagers that can be used for visual recognition, as well as to electronic apparatuses other than the imaging devices and all types of onboard electronic apparatuses.

3. Third Embodiment (Explanation of the Computer to which the Present Technology is Applied)

The series of steps or processes described above may be executed either by hardware or by software. Where these steps or processes are to be carried out by software, the programs constituting the software are installed into a suitable computer. Variations of the computer include one with the software installed beforehand in its dedicated hardware, and a general-purpose personal computer or like equipment capable of executing diverse functions based on the programs installed therein.

FIG. 15 is a block diagram depicting a hardware configuration example of a computer that executes the above-described series of steps or processes using programs.

In the computer, a central processing unit (CPU) 201, a read-only memory (ROM) 202, and a random access memory (RAM) 203 are interconnected by a bus 204.

The bus 204 is further connected with an input/output interface 205. The input/output interface 205 is connected with an input section 206, an output section 207, a storage section 208, a communication section 209, and a drive 210.

The input section 206 is typically made up of a keyboard, a mouse, and a microphone. The output section 207 is formed typically by a display unit and speakers. The storage section 208 is composed of a hard disk or a nonvolatile memory, for example. The communication section 209 is constituted typically by a network interface. The drive 210 drives removable media 211 such as a magnetic disk, an optical disk, a magneto-optical disk, or a semiconductor memory.

In the computer configured as outlined above, the CPU 201 performs the above-described series of steps or processes typically by loading suitable programs from the storage section 208 into the ROM 203 via the input/output interface 205 and bus 204 and executing the loaded programs.

The programs to be executed by the computer (CPU 201) may be recorded on the removable media 211 as packaged media when offered. Alternatively, the programs may be offered via wired or wireless transmission media such as local area networks, the Internet, or digital satellite broadcasts.

In the computer, the programs may be installed from the removable media 211 set in the drive 210 into the storage section 208 via the input/output interface 205. Alternatively, the programs may be installed into the storage section 208 after being transmitted via wired or wireless transmission media and received by the communication section 209. In another alternative, the programs may be installed beforehand in the ROM 202 or in the storage section 208.

Also, the programs to be executed by the computer may be processed chronologically in order as depicted in the present specification; in parallel; or in otherwise appropriately timed fashion such as when they are invoked as needed.

In the present specification, the term "system" refers to an aggregate of multiple components (devices or modules (parts)). It does not matter whether or not all components are housed in the same enclosure. Thus a system may be configured with multiple devices housed in separate enclosures and interconnected via a network, as well as with a single device that houses multiple modules in a single enclosure.

The advantageous effects stated in the present specification are only examples and not limitative of the present technology that may also provide other advantages.

Embodiments according to the present disclosure is not limited to the embodiments discussed above and may be implemented in diverse variations so far as they are within the scope of the subject matter of the present disclosure.

Also, each of the steps described above in reference to the appended flowchart may be performed either by a single device or by multiple devices on a shared basis.

Further, where one step includes multiple processes, these processes may be performed either by a single device or by multiple devices on a shared basis.

Whereas some preferred embodiments of the present disclosure have been described above in detail with reference to the accompanying drawings, these embodiments are not limitative of the present disclosure. It is obvious that those skilled in the art will easily conceive variations or alternatives of the disclosure within the scope of the technical idea stated in the appended claims. It is to be understood that such variations, alternatives and other ramifications also fall within the technical scope of the present disclosure.

The present technology may be configured preferably as follows:

(1) An imaging device including:

an imaging section configured to generate an image of an object by focusing light coming therefrom; and an imaging control section configured to unevenly change a capture interval between the images generated by the imaging section in a single-frame period.

(2) The imaging device as stated in paragraph (1) above, in which the imaging control section is configured to have at least three images captured in the single-frame period.

(3) The imaging device as stated in paragraph (1) or (2) above, in which the imaging control section is configured to gradually change the capture interval between the images generated in the single-frame period.

(4) The imaging device as stated in any one of paragraphs (1) to (3) above, in which the imaging control section is configured to gradually increase the capture interval between the images generated in the single-frame period.

(5) The imaging device as stated in any one of paragraphs (1) to (4) above, in which the imaging control section is configured to gradually decrease the capture interval between the images generated in the single-frame period.

(6) The imaging device as stated in any one of paragraphs (1) to (5) above, in which the capture interval between the images corresponds to a blinking interval of a frequency band ranging from 50 to 600 Hz.

(7) The imaging device as stated in any one of paragraphs (1) to (6) above, in which the capture interval between the images corresponds to the blinking interval of a frequency band ranging from 50 to 300 Hz.

(8) The imaging device as stated in any one of paragraphs (1) to (7) above, in which the capture interval between the images corresponds to the blinking interval of a frequency band ranging from 50 to 120 Hz.

(9) The imaging device as stated in any one of paragraphs (1) to (8) above, in which the imaging control section is configured to provide the same pattern of the capture intervals between the images for each frame.

(10) The imaging device as stated in any one of paragraphs (1) to (9) above, further including:
an image blending section configured to blend the images generated by the imaging section.

(11) The imaging device as stated in paragraph (10) above, in which the image blending section is configured to blend the images generated by the imaging section using a predetermined weight.

(12) The imaging device as stated in paragraph (11) above, in which the imaging control section is configured to change a frame rate in accordance with light and darkness, and
the image blending section is configured to blend the images generated by the imaging section using a weight reflecting the frame rate changed by the imaging control section.

(13) The imaging device as stated in paragraph (12) above, in which the imaging control section is configured to lower the frame rate in accordance with darkness, and
the image blending section is configured to blend the images generated by the imaging section using a weight reflecting the frame rate changed by the imaging control section.

(14) An imaging method including:
causing an imaging device to generate an image of an object by focusing light coming therefrom; and
causing the imaging device to unevenly change a capture interval between the images generated in a single-frame period.

(15) An electronic apparatus including:
an imaging device including
an imaging section configured to generate an image of an object by focusing light coming therefrom, and
an imaging control section configured to unevenly change a capture interval between the images generated by the imaging section in a single-frame period.

(16) An onboard electronic apparatus including:
an imaging device including
an imaging section configured to generate an image of an object by focusing light coming therefrom, and
an imaging control section configured to unevenly change a capture interval between the images generated by the imaging section in a single-frame period.

REFERENCE SIGNS LIST

11 Imaging device, 21 Imaging control section, 22 Imaging section, 23 Timing adjustment buffer, 24 Image blending section, 25 Image processing section

The invention claimed is:

1. An imaging device comprising:
an image sensing device configured to generate an image of an object by focusing light coming therefrom; and
imaging control circuitry configured to control a capture interval between start times of capturing successive images during a single-frame period to provide unequal capture intervals between the images generated by the image sensing device in the single-frame period, wherein the images captured during the single-frame period include at least four images, with progressively increasing capture intervals between the start times of successive images of the at least four images within the single-frame period.

2. The imaging device according to claim 1,
wherein the imaging control circuitry is configured to gradually change the capture interval between the images generated in the single-frame period.

3. The imaging device according to claim 2,
wherein the imaging control circuitry is configured to gradually increase the capture interval between the images generated in the single-frame period.

4. The imaging device according to claim 2,
wherein the capture interval between the images corresponds to a blinking interval of a frequency band ranging from 50 to 600 Hz.

5. The imaging device according to claim 2,
wherein the capture interval between the images corresponds to the blinking interval of a frequency band ranging from 50 to 300 Hz.

6. The imaging device according to claim 2,
wherein the capture interval between the images corresponds to the blinking interval of a frequency band ranging from 50 to 120 Hz.

7. The imaging device according to claim 1,
wherein the imaging control circuitry is configured to provide a same pattern of the capture intervals between the images for each frame.

8. The imaging device according to claim 1, further comprising:
image blending circuitry configured to blend the images generated by the image sensing device.

9. The imaging device according to claim 8,
wherein the image blending circuitry is configured to blend the images generated by the image sensing device using a predetermined weight.

10. The imaging device according to claim 9,
wherein the imaging control circuitry is configured to change a frame rate in accordance with light and darkness, and
the image blending circuitry is configured to blend the images generated by the image sensing device using a weight reflecting the frame rate changed by the imaging control circuitry.

11. The imaging device according to claim 10,
wherein the imaging control circuitry is configured to lower the frame rate in accordance with darkness, and
the image blending circuitry is configured to blend the images generated by the image sensing device using a weight reflecting the frame rate changed by the imaging control circuitry.

12. An imaging method comprising:
causing an imaging device to generate an image of an object by focusing light coming therefrom; and
causing the imaging device to control a capture interval between start times of capturing successive images during a single-frame period to provide unequal capture intervals between the images generated in the single-frame period, wherein the images captured during the single-frame period include at least four images, with progressively increasing capture intervals between the start times of successive images of the at least four images within the single-frame period.

13. An electronic apparatus comprising:
an imaging device including
   an image sensing device configured to generate an image of an object by focusing light coming therefrom, and
   imaging control circuitry configured to control a capture interval between start times of capturing successive images during a single-frame period to provide unequal capture intervals between the images generated by the image sensing device in the single-frame period, wherein the images captured during the single-frame period include at least four images, with progressively increasing capture intervals between the start times of successive images of the at least four images within the single-frame period.

14. An onboard electronic apparatus comprising:
an imaging device including
   an image sensing device configured to generate an image of an object by focusing light coming therefrom, and
   imaging control circuitry configured to control a capture interval between start times of capturing successive images during a single-frame period to provide unequal capture intervals between the images generated by the image sensing device in the single-frame period, wherein the images captured during the single-frame period include at least four images, with progressively increasing capture intervals between the start times of successive images of the at least four images within the single-frame period.

* * * * *